US010066723B2

(12) United States Patent
Pritchard (10) Patent No.: US 10,066,723 B2
(45) Date of Patent: Sep. 4, 2018

(54) DRIVELINE DISCONNECT WITH MODULAR REAR DRIVELINE MODULE (RDM) WITH INTEGRATED COUPLING AND DIFFERENTIAL CONTROL

(71) Applicant: BorgWarner Inc., Auburn Hills, MI (US)

(72) Inventor: Larry A. Pritchard, Macomb, MI (US)

(73) Assignee: BorgWaner Inc., Auburn Hills, MI (US)

( * ) Notice: Subject to any disclaimer, the term of this patent is extended or adjusted under 35 U.S.C. 154(b) by 216 days.

(21) Appl. No.: 14/701,862

(22) Filed: May 1, 2015

(65) Prior Publication Data

US 2015/0330493 A1    Nov. 19, 2015

Related U.S. Application Data

(60) Provisional application No. 61/994,088, filed on May 15, 2014.

(51) Int. Cl.
*F16H 48/32* (2012.01)
*F16H 48/10* (2012.01)
(Continued)

(52) U.S. Cl.
CPC ............. *F16H 48/32* (2013.01); *B60K 17/35* (2013.01); *F16H 48/10* (2013.01); *F16H 48/22* (2013.01);
(Continued)

(58) Field of Classification Search
CPC ............. F16H 57/0435; F16H 57/0445; F16H 57/0479; F16H 57/0483; F16H 2048/106; F16H 48/22; F16H 48/32
See application file for complete search history.

(56) References Cited

U.S. PATENT DOCUMENTS 3,589,483 A    6/1971    Smith
3,869,940 A    3/1975    Webb et al.
(Continued)

FOREIGN PATENT DOCUMENTS

EP    1652719 A1    5/2006
WO    2010038148 A1    4/2010

OTHER PUBLICATIONS

Dry Sump System Technical Explanation, snapshot taken from https://drysump.com/drysump.htm, retrieved on May 16, 2017.*

*Primary Examiner* — Stacey A Fluhart
(74) *Attorney, Agent, or Firm* — Young Basile Hanlon & MacFarlane, P.C.

(57) ABSTRACT

A motor vehicle powertrain (10, 210, 310) having a rear driveline module (RDM) (20) for driving a pair of rear wheels (14a, 14b) and a method of assembly can include a hydraulically actuatable rear axle coupling clutch (28) operable to transmit rotary power between an input pinion shaft (22, 222) and a rear differential case (30, 230) and a hydraulic actuating assembly (16). The powertrain (10, 210, 310) can include a hydraulically actuatable differential control clutch (34) mounted coaxial to the rear axle coupling clutch (28) and a power take-off unit (PTU) (36) having a hydraulically actuatable PTU coupling clutch (42). The differential control clutch (34) can provide for speed differentiation between the rear differential case (30, 230) and a half axle shaft (26a, 26b) drivingly connected to the pair of rear wheels (14a, 14b). The PTU coupling clutch (42) can transmit rotary power between an input shaft operable to receive rotary power from a front differential case and an output pinion shaft (40) interconnected with the input pinion shaft (22, 222) through a driveshaft (18) in an all-wheel drive mode.

15 Claims, 4 Drawing Sheets

(51) Int. Cl.
  *F16H 57/04* (2010.01)
  *F16H 48/22* (2006.01)
  *F16H 48/38* (2012.01)
  *B60K 17/35* (2006.01)

(52) U.S. Cl.
  CPC .............. *F16H 48/38* (2013.01); *F16H 57/04* (2013.01); *F16H 57/0435* (2013.01); *F16H 57/0479* (2013.01); *F16H 57/0483* (2013.01); *F16H 2048/106* (2013.01); *F16H 2048/382* (2013.01); *Y10T 29/49465* (2015.01)

(56) References Cited

U.S. PATENT DOCUMENTS

| | | | |
|---|---|---|---|
| 4,058,027 A | 11/1977 | Webb | |
| 4,781,265 A | 11/1988 | Weiler et al. | |
| 5,208,755 A * | 5/1993 | Tezuka | B60K 23/04 180/197 |
| 5,570,755 A | 11/1996 | Fruhwirth et al. | |
| 5,868,642 A * | 2/1999 | Kobayashi | B60K 17/20 475/203 |
| 6,578,654 B2 | 6/2003 | Porter | |
| 6,672,420 B2 | 1/2004 | Porter | |
| 7,258,213 B2 | 8/2007 | Ekonen et al. | |
| 7,357,236 B2 | 4/2008 | Yoshioka | |
| 7,452,301 B2 | 11/2008 | Yoshioka | |
| 7,506,559 B2 | 3/2009 | Swanson et al. | |
| 7,568,568 B2 | 8/2009 | Porter et al. | |
| 7,857,723 B2 | 12/2010 | Krisher | |
| 7,878,933 B2 | 2/2011 | Porter et al. | |
| 8,047,323 B2 | 11/2011 | Downs et al. | |
| 8,132,638 B2 | 3/2012 | Martus et al. | |
| 8,469,854 B1 * | 6/2013 | Downs | B60K 23/08 475/221 |
| 2007/0021262 A1 * | 1/2007 | Honda | B60K 23/04 475/204 |
| 2007/0060436 A1 * | 3/2007 | Boddy | B60W 30/02 475/84 |
| 2012/0247911 A1 * | 10/2012 | Noda | B60L 3/0023 192/113.32 |
| 2013/0244830 A1 * | 9/2013 | Quehenberger | B60K 23/08 477/36 |
| 2014/0309076 A1 * | 10/2014 | Schimpf | F16H 48/22 475/246 |

* cited by examiner

DRIVELINE DISCONNECT WITH MODULAR REAR DRIVELINE MODULE (RDM) WITH INTEGRATED COUPLING AND DIFFERENTIAL CONTROL

FIELD OF THE INVENTION

The invention relates to vehicle drivelines and more particularly to a hydraulically actuated vehicle driveline with a disconnect system for operation between an all-wheel drive mode and a two wheel drive mode of a vehicle.

BACKGROUND

Current use of rear driveline modules (RDMs) in a vehicle can allow operation of the vehicle in an all-wheel drive (AWD) mode or a two-wheel drive mode. Current vehicles can also include a disconnectable power take-off unit (PTU) allowing switching operation of a vehicle between a two-wheel drive mode and an AWD mode. The RDM can include a rear drive axle and one or more rear drive wheels. Current differential clutch assemblies can be mounted on a differential axis, while AWD coupling clutch assemblies can be mounted on a secondary drive axle, resulting in the need to provide return lines and additional sealing features to separate dissimilar lubricants when actuating the clutch assemblies with a hydraulic actuator. Current RDMs can also use splash lubrication during operation resulting in parasitic losses. Hydraulic coupling assemblies have been disclosed in U.S. Pat. No. 7,857,723; U.S. Pat. No. 7,452,301; and U.S. Pat. No. 7,357,236.

In an effort to minimize loss and provide a more fuel efficient driveline in an AWD vehicle during the two-wheel drive mode, it can be desirable to disconnect the RDM. Current disconnect systems can require a dog clutch located at the PTU and a rear axle coupling clutch mounted on the rear drive axle for synchronization of the driveline prior to reconnection of the RDM. The current configuration results in blocked shifts in the PTU when the dog clutch is engaged and also requires an actuator to be located in close proximity to the PTU for engagement of the dog clutch. The coupling clutch is required to synchronize the driveline in a timely fashion, preferably around 100 milliseconds. Disconnect mechanisms for AWD vehicles have been previously disclosed in U.S. Pat. No. 8,132,702; U.S. Pat. No. 8,047,323; U.S. Pat. No. 7,878,933; U.S. Pat. No. 7,568,568; and W.O. Application No. 2010/022, 2221148.

SUMMARY

A motor vehicle powertrain can include a rear driveline adapted to drive a pair of rear wheels. The motor vehicle powertrain can also include a hydraulic actuating assembly. The rear driveline can include a driveshaft and a rear driveline module (RDM). The RDM can include an input pinion shaft, a rear differential having a differential axis, a pair of half axle shafts drivingly connected to the pair of rear wheels and rotatable around the differential axis, and a hydraulically actuated rear axle coupling clutch mounted along the differential axis. The rear axle coupling clutch can be interposed between the pair of rear wheels. The rear differential can include a rear differential case that can drive a pair of rear output gears drivingly coupled to the half axleshafts. The rear axle coupling clutch can be actuated to transmit rotary power between the input pinion shaft and the rear differential case.

The motor vehicle powertrain can include at least one of a hydraulically actuatable differential control clutch, a power take-off unit (PTU), a lubrication delivery system, and any combination thereof. The differential control clutch can be mounted along the differential axis coaxial with the rear axle coupling clutch and actuatable for speed differentiation between the differential case and at least one of the pair of half axle shafts. The PTU can include an input shaft operable to receive rotary power from a front differential case, an output pinion shaft, and a hydraulically actuated PTU coupling clutch. The driveshaft can interconnect the output pinion shaft and the input pinion shaft. The hydraulic actuating assembly can actuate the PTU coupling clutch for transmitting rotary power between the input shaft and the output pinion shaft. The lubrication delivery system can include a lube distribution apparatus for distributing a fluid to the RDM, a scavenging apparatus for scavenging fluid from a fluid source and redirecting the fluid to the lube distribution apparatus, and a plurality of lube distribution passages. The plurality of lube distribution passages can be in fluid communication between the lube distribution apparatus and a plurality of predetermined locations in the RDM.

A method of assembling the motor vehicle powertrain can include assembling a hydraulically actuatable differential control clutch, a power take-off unit (PTU), and a hydraulic actuating assembly. The differential control clutch can be actuated for speed differentiation between the differential case and at least one of the pair of half axle shafts. The PTU can include an input shaft operable to receive rotary power from a front differential case, an output pinion shaft, and a hydraulically actuatable PTU coupling clutch. The driveshaft can interconnect the output pinion shaft and the input pinion shaft. The hydraulic actuating assembly can actuate the PTU coupling clutch for transmitting rotary power between the input shaft and the output pinion shaft. The hydraulic actuating assembly can include a fluid source operable to receive and contain a hydraulic fluid, and at least one source of pressurized fluid in fluid communication with the fluid source. The method can further include positioning the differential control clutch along the differential axis coaxial with the rear axle coupling clutch and positioning the PTU connectable with the RDM.

The method can include assembling a plurality of control valves, a lubrication control valve, and a plurality of hydraulic actuators. The plurality of control valves can control the rear axle coupling clutch, the PTU coupling clutch, and the differential control clutch. The plurality of control valves can selectively control fluid communication between various components when moved between at least first and second valve positions. Each control valve can be normally biased toward a closed position for discharging fluid to a fluid sump. The lubrication control valve can be in fluid communication with the at least one source of pressurized fluid and can provide for selective control of fluid communication between components when moved between first and second positions. The lubrication control valve is normally biased toward a first position for supplying lubrication to the RDM. The plurality of hydraulic actuators can be in fluid communication with the plurality of control valves for selective fluid communication between the source of pressurized fluid and the corresponding clutch assembly to frictionally load the corresponding clutch assembly. The plurality of hydraulic actuators can control the rear axle coupling clutch, the positioning the plurality of control valves, the lubrication control valve, and the plurality of hydraulic actuators for fluid communication between the hydraulic actuating assembly and the rear axle coupling clutch, the differential control clutch, and the PTU coupling clutch.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring briefly to FIGS. 1-4, a rear-wheel drive (RWD) or an all-wheel drive (AWD) motor vehicle can include a powertrain 10, 210, 310 for transferring rotary power from a primary source of power, such as an internal combustion engine and/or an electric motor. The powertrain 10, 210, 310 can include any type of ratio-changing mechanism, such as a manual, automatic, or continuously variable transmission. The powertrain 10, 210, 310 can transfer the rotary power to a front driveline module (FDM) or a rear driveline module (RDM) 20, 320. In a RWD vehicle, the powertrain 10, 210, 310 can include a rear driveline 12 and a hydraulic actuating assembly 16. In an AWD vehicle, the powertrain 10, 210, 310 can split rotary power between a front driveline and a power take-off unit (PTU) 36 operable for transferring rotary power to the rear driveline 12. The rear driveline 12 can include a driveshaft 18 transferring rotary power to the RDM 20, 320 for driving a pair of rear wheels 14a, 14b. The RDM 20, 320 can include an input pinion shaft 22, 222, a rear differential 24, 224 rotatable around a differential axis, a pair of half axle shafts 26a, 26b, and a rear axle coupling clutch 28. The hydraulic actuating assembly 16 can actuate the rear axle coupling clutch 28. The rear axle coupling clutch 28 can be mounted along the differential axis of the rear differential 24, 224. The rear axle coupling clutch 28 can be interposed between the pair of rear wheels 14a, 14b. Each of the pair of half axle shafts 26a, 26b can be drivingly connected to a corresponding one of the pair of rear wheels 14a, 14b and rotatable around the differential axis. The rear differential 24, 224 can include a rear differential case 30, 230. The rear differential 24, 224 can drive a pair of rear output gear shafts 32a, 32b supporting sun gears 126a, 126b drivingly coupled to the pair of half axle shafts 26a, 26b. The rear axle coupling clutch 28 can transmit rotary power from the input pinion shaft 22, 222 as input to the rear differential case 30, 230 through a ring gear 112 to a common planetary carrier 124a, 124b when engaged.

Figure 1:
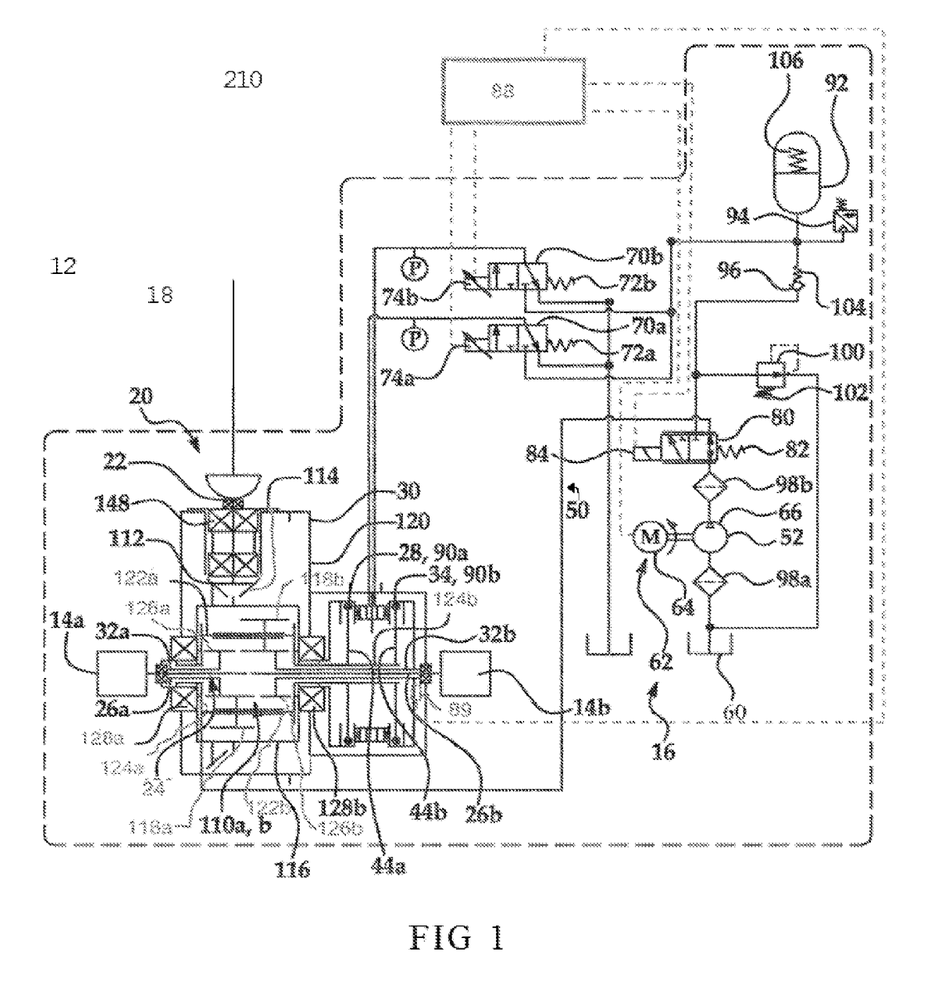
FIG. 1 is a schematic view of a rear driveline module (RDM) having a rear axle coupling clutch and a differential control clutch.
Figure 2:
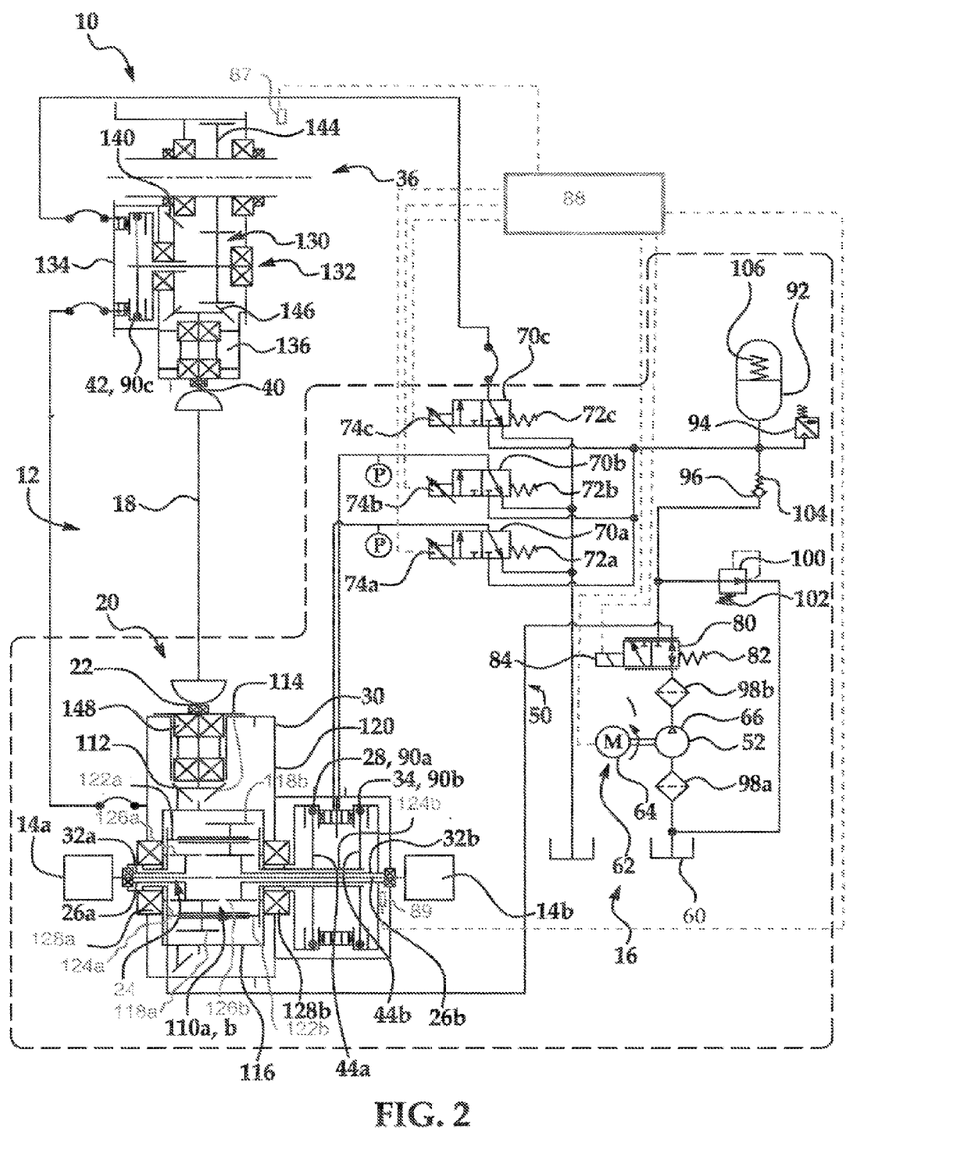
FIG. 2 is a schematic view showing the RDM having a rear axle coupling clutch, a differential control clutch, and a power take-off unit (PTU) coupling.
Figure 3:
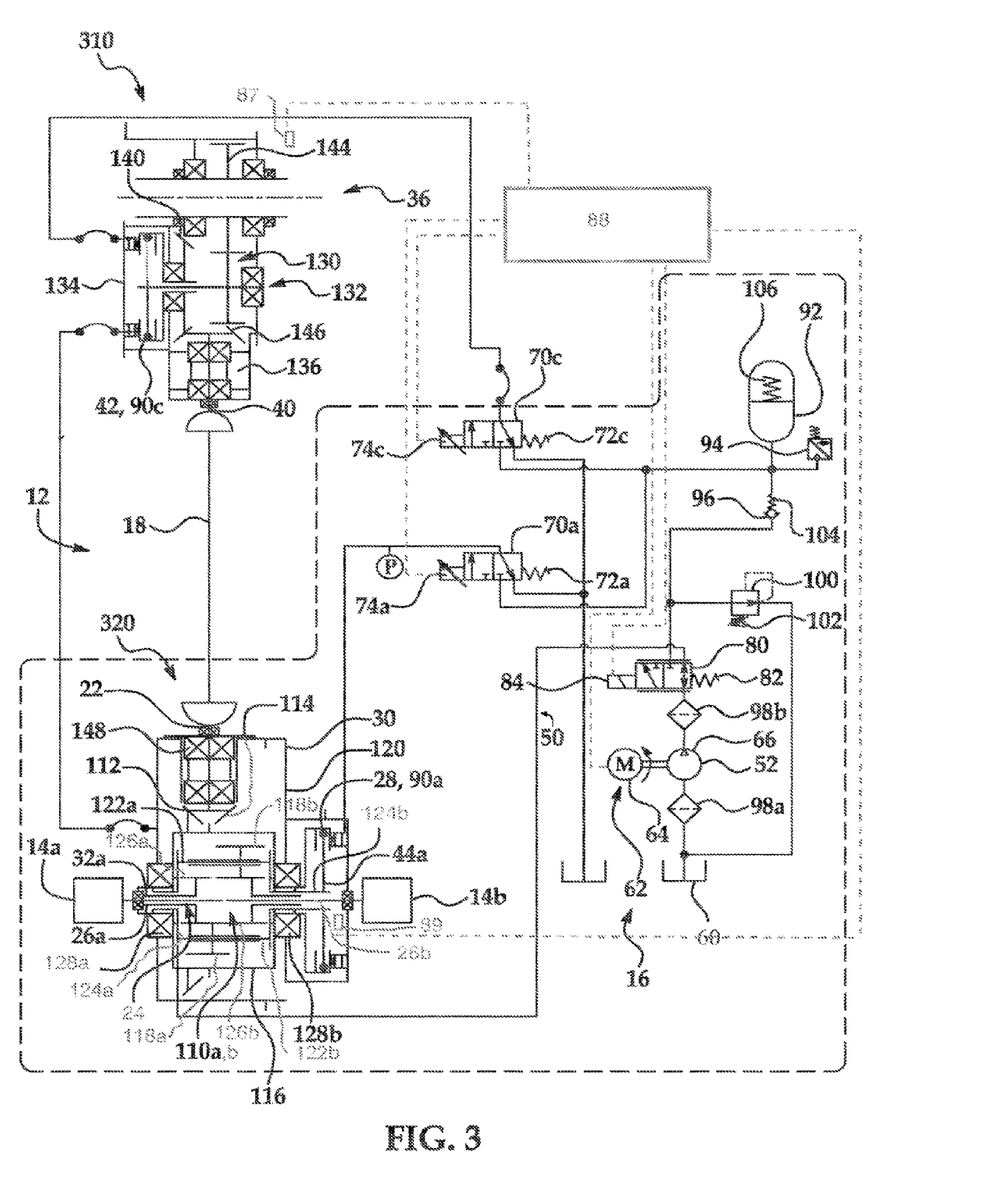
FIG. 3 is a schematic view showing the RDM having a rear axle coupling clutch and a power take-off unit (PTU) coupling.

Referring now to FIGS. 1-3, a powertrain 210 is illustrated to include a differential control clutch 34 mounted along a differential axis coaxial with the rear axle coupling clutch 28. The differential control clutch 34 can connect the sun gear 126b to the common planetary carrier 124a, 124b to transmit rotary power when engaged. The hydraulic actuating assembly 16 can actuate the differential control clutch 34 for speed differentiation between the rear differential case 30, 230 and at least one of the pair of half axle shafts 26a, 26b. As illustrated in FIGS. 1-3, the hydraulic actuating assembly 16 can include a fluid source reservoir 60 operable to receive and contain a hydraulic fluid and at least one source of pressurized fluid 62.

The at least one source of pressurized fluid 62 can be in fluid communication with the fluid source reservoir 60 for pressurizing the fluid from the fluid source reservoir 60 and for selectively providing the pressurized fluid to the hydraulic actuating assembly 16 and to the on-demand lubrication system control valve 80. The at least one source of pressurized fluid 62 and the hydraulic actuating assembly 16 can provide on-demand lubrication of various components within the rear differential case 30, 230 requiring lubrication during operation, by way of example and not limitation, such as at least one clutch assembly 28, 34, 42. The at least one clutch assembly can include the rear axle coupling clutch 28, as seen in FIGS. 1-3, and/or the differential control clutch 34, as seen in FIGS. 1-2, and/or the PTU coupling clutch 42, as seen in FIGS. 2-3. The on-demand axle lubrication system allows the use of a dry sump with minimal or no shearing of the fluid by the axle ring gear, or other components within the rear differential case 30, 230, thereby greatly increasing the efficiency of the unit. The hydraulic fluid can be engine oil suitable for use in a motor vehicle. The at least one source of pressurized fluid 62 can include an electric motor 64 and a fluid pump 66. A single fluid pump 66 can pressurize fluid from the fluid source reservoir 60 providing a source of pressurized fluid for use to lubricate components in the rear differential case 30 passing through the on-demand lubrication control valve 80, as seen in FIGS. 1-3, and/or for actuation of the rear axle coupling clutch 28 passing through control valve 70a, as seen in FIGS. 1-3, and/or for actuation of the differential control clutch 34 passing through control valve 70b, as seen in FIGS. 1-2, and/or for actuation of the PTU coupling clutch passing through control valve 70c, as seen in FIGS. 2-3 of the hydraulic actuating assembly 16. The at least one source of pressurized fluid 62 is not limited to any particular hydraulic fluid pressure generating device and can include without limitation a pump, valves, hydraulic accumulator, and electronic control unit, or any combination thereof.

The hydraulic actuating assembly 16 can further include at least one filter 98a, 98b for removing contaminants from the fluid. The at least one filter 98a can be located between the fluid source reservoir 60 and the at least one source of pressurized fluid 62. The at least one filter 98b can be located between the at least one source of pressurized fluid 62 and a lubrication control valve 80. A lubrication valve biasing spring 82 can normally bias the lubrication control valve 80 toward a first position allowing fluid communication between the fluid source reservoir 60 through the lubrication control valve 80 and to the rear differential case 30 for lubrication of components housed within the RDM 20, 320. The lubrication control valve 80 can include a solenoid actuator 84 and a two-way valve operable for switching between the first position and a second position. The solenoid actuator 84 can overcome the spring force of the lubrication valve biasing spring 82 to switch the lubrication control valve 80 to the second position allowing fluid communication between the source of pressurized fluid 62 and an accumulator 92, well as at least one clutch control valves 70a, 70b, 70c. The hydraulic actuating assembly 16 can further include a fluid pressure responsive bypass valve 100 providing fluid communication between the source of pressurized fluid, either pump 66 and/or accumulator 92, for diverting excess fluid pressure and volume back to the fluid source reservoir 60. The bypass valve 100 can include a valve spring 102 for normally biasing the bypass valve 100 toward a closed position preventing recirculation of pressurized fluid back to the collection sump of the fluid source reservoir 60 to normally direct fluid flow to the hydraulic actuating assembly 16, when a fluid pressure threshold is not exceeded. The bypass valve 100 can provide for fluid flow back to the fluid source reservoir 60 in response to fluid pressure in the hydraulic actuating assembly 16 which is greater than the biasing force of the valve spring 102.

Pressurized fluid from the source of pressurized fluid 62 can flow through a check valve 96 in fluid communication with the accumulator 92. The check valve 96 can include a spring 104 to prevent back flow of pressurized fluid from the accumulator 92 toward the pump 66. The pressurized fluid can normally overcome the biasing force of the spring 104 to unseat a check valve member, such as a ball, in order to pass through the check valve 96. The check valve 96 provides fluid flow in one direction only, thereby blocking fluid flow in the opposite direction toward the at least one source of pressurized fluid 62.

After passing through the check valve 96, the pressurized fluid can flow to at least one control valve 70a, 70b, 70c and/or the hydraulic accumulator 92. The hydraulic accumulator 92 can operate as a pressurized fluid reservoir for holding a volume of fluid under pressure and for maintaining the fluid pressure in the fluid control circuit of the rear axle coupling clutch 28 and/or differential control clutch 34 and/or PTU coupling clutch 42 during times when control valve 80 is in the first position directing fluid flow to the lubrication passage system of the rear differential case 30. The hydraulic accumulator 92 can include an accumulator spring 106 acting against a diaphragm for maintaining the volume of fluid under pressure. The accumulator 92 can also assist in dampening pressure fluctuations of the pressurized fluid during operation of the fluid circuit. The hydraulic accumulator 92 can include a pressure relief valve 94 for setting a discharge pressure of the hydraulic accumulator 92 in the event the fluid pressure increases above a predetermined threshold. The pressurized fluid can flow either from the hydraulic accumulator 92, or if fluid control valve 80 is in the second position, from the fluid pump 66 through the check valve 96 for delivery to at least one control valve 70a, 70b, 70c.

As illustrated in FIG. 1, the at least one control valve 70a, 70b can include a first control valve 70a for selectively directing pressurized fluid to a rear axle coupling clutch 28 and a second control valve 70b for selectively directing pressurized fluid to a differential control clutch 34. Each of the plurality of control valves 70a, 70b can have a biasing spring 72a, 72b for normally biasing the control valve 70a, 70b toward a first position for discharging pressurized fluid from the corresponding clutch 28, 34 into the fluid source reservoir 60. A solenoid actuator 74a, 74b can be provided for switching the control valve 70a, 70b from the first position into a second position for placing the corresponding clutch 28, 34 in fluid communication with the source of pressurized fluid, either the accumulator 92 and/or the pump 66, for pressurized fluid actuation of the corresponding clutch 28, 34.

A control system 88, such as an engine control unit (ECU), can be provided to selectively control operation of the fluid pump motor 64, the on-demand lubrication system solenoid actuator 84, and the clutch control solenoid actuators 74a, 74b in accordance with a control program stored in memory for automatic actuation of the RDM 20. The control system can provide signals to the clutch control solenoid actuators 74a, 74b based on detection of rotary power in a front driveline module (FDM) for individually actuating either the rear axle coupling clutch 28 through selectively energizing the solenoid actuator 74a of fluid control valve 70a, or the rear axle coupling clutch 28 and the differential control clutch 34 through selectively energizing both solenoid actuators 74a, 74b of the fluid control valves 70a, 70b. The first position of each control valve 70a, 70b can correspond to a closed position preventing pressurized fluid from being in fluid communication with the corresponding clutch 28, 34, while allowing fluid communication to discharge pressurized fluid from the fluidly connected clutch actuator 90a, 90b of the corresponding clutch 28, 34 into the fluid source reservoir 60 to return the connected clutch 28, 34 to a normal spring biased position when isolated from fluid communication with the source of pressurized fluid from the accumulator 92 and/or the fluid pump 66. The second position of the control valve 70a, 70b can correspond to an open position allowing for fluid communication of pressurized fluid, from either the accumulator 92 and/or the fluid pump 66, with a connected hydraulic actuator 90a, 90b of the corresponding clutch 28, 34. Each solenoid actuator 74a, 74b can switch the corresponding fluid control valve from the normal spring biased first position to the second position.

After the pressurized fluid passes through at least one of the control valves 70a, 70b in the second position, the pressurized fluid can flow to the corresponding fluidly connected hydraulic actuator 90a, 90b. A hydraulic actuator 90a, 90b can be provided for each one of the rear axle coupling clutch 28 and the differential control clutch 34 as part of, or operably associated with, the RDM 20. Each hydraulic actuator 90a, 90b can respond to the presence of pressurized fluid to frictionally load the corresponding one of the rear axle coupling clutch 28 and the differential control clutch 34. Each of the rear axle coupling clutch 28 and the differential control clutch 34 can include a corresponding friction clutch pack 44a, 44b including sets of alternating friction plates arranged in a conventional manner as recognized by those skilled in the art. During engagement of the rear axle coupling clutch 28 or the differential control clutch 34, the pressurized fluid can frictionally load and compress the friction plates within the corresponding friction clutch pack 44a, 44b. The coaxial mounting of the rear axle coupling clutch 28 and the differential control clutch 34 minimizes space requirements. The pressurized fluid can also lubricate components requiring lubrication within the rear differential case 30, 230 during operation through selective operation of fluid control valve 80 by control unit 88.

The hydraulic actuator 90a can actuate the rear axle coupling clutch 28 for engagement of the RDM 20. The RDM 20 can include the rear differential case 30, 230 for supporting a pair of rear output shafts 32a, 32b connected to sun gears 126a, 126b and coupled to a pair of half axle shafts 26a, 26b. The rear differential case 30, 230 can include a ring gear housing 120 and a carrier housing 116 mounted to the rear differential 24, 224. The carrier housing 116 can support a bevel ring gear 112 for rotation and is connected to rotate a portion of the clutch pack 44a. A plurality of ring gear support bearings 128a, 128b can support the bevel ring gear 112 allowing rotation of the bevel ring gear 112. The driveshaft 18 can rotate and drive the input pinion shaft 22, 222.

The ring gear housing 120 can receive the rear axle coupling clutch 28, the differential control clutch 34, and a carrier assembly 110a, 110b. The bevel ring gear 112 can drive a dual planetary carrier assembly 110a, 110b with a common planetary gear carrier 124a, 124b through the rear axle coupling clutch 28 when engaged. The planetary carrier assembly 110a, 110b supports a first planetary gear 118a and a second planetary gear 118b separately and independently meshed with a first rear output sun gear 126a and a second rear output sun gear 126b, respectively. The first and second sun gears 126a, 126b are supported by separate first and second rear output shafts 32a, 32b, respectively, for independent rotation with respect to one another.

The carrier assembly 110a, 110b can include two sets of planetary gears 118a, 118b supported for rotation on separate planetary gear shafts 122a, 122b supported for rotation with a common planetary gear carrier 124a, 124b. The two sets of planetary gears 118a, 118b intermesh independently and separately with first and second sun gears 126a, 126b to drive first and second independent half axleshafts 26a, 26b, respectively. The first set of planetary gears 118a are supported on planetary gear shafts 122a to be driven by the common planetary gear carrier 124a, 124b and can drive the first half axleshaft 26a through the first sun gear 126a. The second set of planetary gears 118b are supported on the planetary gear shafts 122b to be driven by the common planetary gear carrier 124a, 124b and can drive the second half axleshaft 26b through the second sun gear 126b. The bevel ring gear 112 can drive the two sets of planetary gears 122a, 122b through the common planetary gear carrier 124, 124b supporting the separate planetary gear shafts 122a, 122b. The two sets of planetary gears 118a, 118b can be rotate independently of one another. It should be recognized by those skilled in the art, that other carrier assembly designs other than the one illustrated can be employed in the rear differential case 30, 230 without departing from the spirit or scope of the present invention.

To increase efficiency of the powertrain 10, the ring gear 112 can be disengaged from the driveline during a two-wheel drive mode. The full volume and mass of the RDM 20 can be used as a heat sink for increased thermal capability. A single pump can be used to provide both actuation pressure and on-demand clutch and axle lubrication.

In operation, the rear axle coupling clutch 28 can provide for a "disconnected" vehicle mode when the rear axle coupling clutch 28 has not been hydraulically actuated by the at least one hydraulic actuator 90a and is in a disengaged position, thereby preventing rotary power from being transmitted through the rear axle coupling clutch 28. In the disconnected mode, the pair of rear wheels 14a, 14b, the half axleshafts 26a, 26b, the sun gears 126a, 126b, and the common planetary gear carrier 124a, 124b can be disconnected from the ring gear 112 and input pinion shaft 22, 222. Rotation of some components, such as the sun gears 126a, 126b and planetary gears 118a, 118b can result from rolling motion of the pair of rear wheels 14a, 14b, while back-driving of other components, such as the ring gear 112, the input pinion shaft 22, 222 and the driveshaft 18, is prevented. A "connected" vehicle mode can be established when the rear axle coupling clutch 28 is engaged by the hydraulic pressure exerted on the friction clutch pack 44a allowing the driveshaft 18 to transmit rotary power to the pair of rear wheels 14a, 14b through the bevel pinion gear 114 driving the bevel ring gear 112, and the ring gear 112 connected to the common planetary gear carrier 124a, 124b through the engaged coupling clutch 28.

In operation, the differential control clutch 34 can be in an open differential mode or a locked differential mode. An open differential mode occurs when the differential control clutch 34 is not hydraulically actuated by the at least one hydraulic actuator 90b and is disengaged. The differential control clutch 34 can selectively limit speed differentiation between the rear differential case 30, 230 and at least one of the pair of half axleshafts 26b. The open differential mode allows at least one of the pair of half axleshafts 26a, 26b to rotate relative to the other of the pair of half axleshafts 26a, 26b. The rotary power transferred by the rear axle coupling clutch 28 in the engaged mode to the rear differential 24, 224 in the open differential mode can be transmitted to the pair of rear wheels 14a, 14b based on the tractive conditions of the road. A locked differential mode of the differential control clutch 34 occurs when the differential control clutch 34 is engaged to prevent relative rotation between the at least one of the pair of half axleshafts 26a, 26b. In other words, the first and second half axleshafts 26a, 26b rotate together by connecting the second sun gear 126b to the common planetary gear carrier 126a, 126b for driving the first sun gear 126a. When the differential control clutch 34 is locked, the pair of half axleshafts 26a, 26b is driven through the rear axle coupling clutch 28 to transmit rotary power to turn both rear wheels 14a, 14b regardless of tractive conditions of the road.

Referring now to FIGS. 2-3, an improvement of a powertrain 10, 310 is shown to include a PTU 36 having a hydraulically actuatable PTU coupling clutch 42 for use in an AWD vehicle. The PTU 36 can further include an input shaft gear 144 operable to receive rotary power from a front differential case and an output pinion shaft 40 interconnected with the input pinion shaft 22, 222 through the driveshaft 18. The hydraulic actuating assembly 16 can actuate the PTU coupling clutch 42 for transmitting rotary power between the input shaft gear 144 and the output pinion shaft 40. In operation, the motor vehicle can normally be operated in a two-wheel drive mode or front-wheel drive mode in which the PTU 36 is disengaged from the input shaft gear 144 with coupling clutch 42 and the RDM 20 is disengaged with rear axle coupling clutch 28. In the two-wheel drive mode, the powertrain 10 can transfer rotary power to a front driveline module. In the two-wheel drive mode, the rear axle coupling clutch 28 can be maintained in a disconnected mode such that ring gear 112, input pinion shaft 22, drive shaft 18, output pinion gear 146, and ring gear 140 are not back-driven due to rolling movement of the pair of rear wheels 14a, 14b. An engaged mode of the RDM 20 occurs when the PTU coupling clutch 42 is engaged and the rear axle coupling clutch 28 is engaged. The differential control clutch 34 can be engaged when positive traction of both rear wheels is desired. The AWD vehicle can include a control system in communication with a variety of vehicle sensors providing data indicative of parameters pertaining to vehicle operating conditions including, but not limited to, vehicle speed, four-wheel drive mode, two-wheel drive mode, wheel slip, and vehicle acceleration. The control system can provide signals to the hydraulic actuating assembly 16 for clutch actuation based on a control program stored in memory in response to detected data relating to vehicle operation conditions.

FIGS. 2-3 are contemplated to incorporate the aforementioned description of the hydraulic actuating assembly 16 with respect to FIG. 1 which is incorporated by reference herein. In addition to the plurality of control valves 70a, 70b and plurality of hydraulic actuators 90a, 90b aforementioned with respect to FIG. 1, the hydraulic actuating assembly 16 can additionally include a control valve 70c and a hydraulic actuator 90c for actuation of the PTU coupling clutch 42. A fixed or flexible tube connection can interconnect the hydraulic actuator 90c with the control valve 70c located on the RDM 20. The fixed or flexible tube connection can provide for packaging flexibility of the powertrain 10. The hydraulic actuator 90c can respond to pressurized fluid to frictionally load the PTU coupling clutch 42. The PTU coupling clutch 42 can include a friction clutch pack 44c including a set of alternating friction plates as recognized by those skilled in the art. During actuation of the PTU coupling clutch 42, the pressurized fluid can frictionally load and compress a set of alternating friction plates within the friction clutch pack 44c to connect the rotation driven by the input shaft gear 144 through the intermediate gear 130 to the input portion of the clutch plate pack 44c to drive the output portion of the friction clutch pack 44c connected to the ring gear 140 when engaged. Actuation of the PTU coupling clutch 42 can engage the PTU 36 in the powertrain 10 to drive rotation of the input portion of friction clutch pack 44a through ring gear 140, pinion gear 146, shaft 40, driveline 18, shaft 22, pinion 114, and ring gear 112. The output portion of friction clutch pack 44a is driven in rotation when a rear axle coupling clutch 28 is engaged to drive the common planetary gear carrier 124a, 124b.

The PTU 36 can include a PTU case 132, a ring gear housing 136 for enclosing a gear train including an intermediate gear 130 driven by input shaft gear 144, a ring gear 140 driven by the intermediate gear 130 through the PTU coupling clutch 42, and a pinion gear 146 driven by the ring gear 140 and fixed to the output pinion shaft 40. The output pinion shaft 40 can drive the driveshaft 18 as input for the RDM 20 as previously described. FIGS. 2-3 includes the previous description of the RDM 20 from FIG. 1 above which is incorporated by reference herein. The PTU case 132 can also include a PTU coupling clutch housing 134. The PTU coupling clutch housing 134 can enclose the PTU coupling clutch 42. The PTU ring gear 140 can be driven by the input shaft gear 144 through the intermediate gear 130 and coupling clutch 42 to receive rotary power from the front differential case located within the front driveline module. When the PTU coupling clutch 42 is disengaged, the input shaft gear 144 and intermediate gear 130 can be uncoupled from the ring gear 140 preventing the transfer of rotary power from the front driveline module to the rear driveline module.

Referring now to FIGS. 1-3, in operation, when a driver desires to operate the vehicle in the AWD mode, the vehicle can include a control system 88 for signaling the hydraulic actuating assembly 16. The control system can provide for synchronization of moving parts prior to engagement of the RDM 20, 320 automatically based on rotational speed differentiation in response to vehicle operating condition sensor readings. The hydraulic actuating assembly 16 can actuate the PTU coupling clutch 42 and the rear axle coupling clutch 28. The control system 88 can include at least one speed sensor 87, 89 for detecting the rotary speed of the input shaft from the front driveline module and the rotary speed of the rear axleshafts 26a, 26b for determining a speed synchronization protocol for the RDM 20, 320. The ring gear housing 120 can receive the rear axle coupling clutch 28, and a carrier assembly 110a, 110b. The bevel ring gear 112 can drive a dual planetary carrier assembly 110a, 110b with a common planetary gear carrier 124a, 124b through the rear axle coupling clutch 28 when engaged. The planetary carrier assembly 110a, 110b supports a first planetary gear 118a and a second planetary gear 118b separately and independently meshed with a first rear output sun gear 126a and a second rear output sun gear 126b, respectively. The first and second sun gears 126a, 126b are supported by separate first and second rear output shafts 32a, 32b, respectively, for independent rotation with respect to one another. The control system 88 can control fluid communication of pressurized fluid with the actuators 90b, 90c to engage the PTU coupling clutch 42 and rear coupling clutch 28 through the hydraulic actuating assembly 16. After speed synchronization between the moving parts, the hydraulic actuating assembly 16 can fully engage the rear axle coupling clutch 28 and the PTU coupling clutch 42 such that the powertrain 10 can transmit rotary power between the front driveline module and the RDM 320. The hydraulic actuating assembly 16 can gradually actuate the PTU coupling clutch 42 and the rear axle coupling clutch 28 to synchronize the speed of the front driveline module and the RDM 20. As illustrated in FIG. 2, the powertrain 10 can additionally include a differential control clutch 34 mounted along a common axis of rotation with the rear differential 24, 224. The rear coupling clutch 28 and differential control clutch 34 can be coaxial with the rear half axleshafts 26a, 26b. The differential control clutch 34 can be in an open differential mode or a locked differential mode when the vehicle is operating in an AWD mode. It is contemplated that the vehicle operator can select the locked mode manually or the actuation of the differential control clutch 34 can be automatically controlled through the control system 88. The control system 88 can provide signals for the automatic actuation of the differential control clutch 34 based on sensed vehicle operating conditions in response to a control program stored in memory.

Historically, all-wheel drive (AWD) couplings have been mounted to the axle pinion of the secondary drive axle. Likewise, differential control clutches have been mounted along the differential/ring gear axis. The separation of the two clutching devices creates a problem when using one prime mover as the actuator for both. Specifically, when performing these actions with a hydraulic actuator, with its own unique fluid, it forces the designer to provide for return lines and additional sealing features to separate dissimilar lubricants. The present invention simplifies the incorporation of these functions by mounting both clutches on the same axis, i.e. a ring gear/differential axis, and by sharing the oil between the clutch actuation devices and the axle ring, pinion and differential gears. This change in construction creates several advantages including: allowing the ring gear to be disconnected from the driveline for efficiency reasons; using the full volume and mass of the ROM as a heat sink for increased thermal capability; and allowing use of a single pump to provide for both actuation pressures and on-demand clutch and axle lubrication. The on-demand axle lubrication enables a dry sump with minimal or no shearing of the oil by the axle ring gear greatly increasing the efficiency of the unit.

Figure 4:
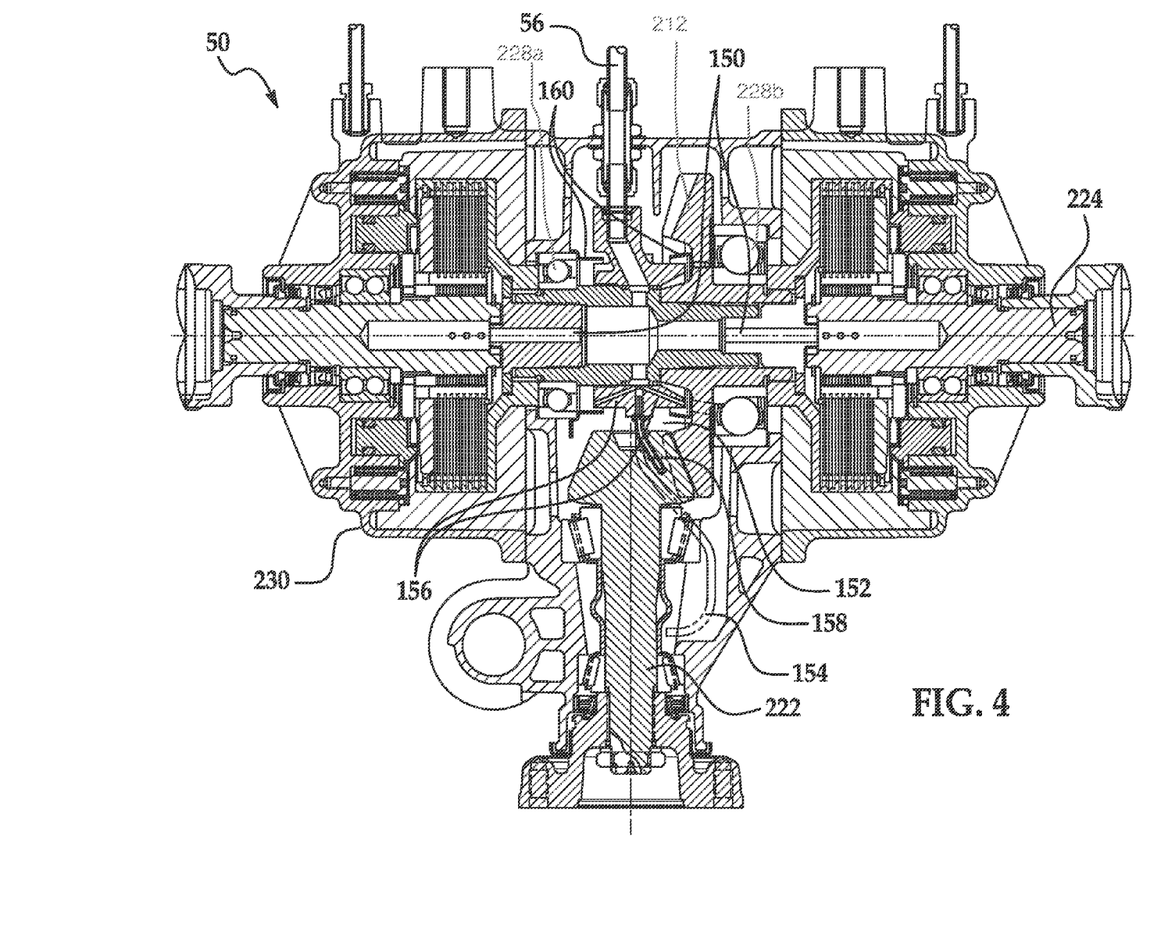
FIG. 4 is a cross sectional view of a transfer case having a lubrication delivery system.

Referring now to FIG. 4, an improvement of a powertrain is shown to include a lubrication delivery system 50. The lubrication delivery system 50 can be used in combination as part of the lubrication system supplied through control valve 80 illustrated in FIGS. 1-3 or as illustrated in FIG. 4 for a generic dry sump rear driveline module. The lubrication delivery system 50 can include a lubrication distribution apparatus 52, as seen in FIGS. 1-3 including a motor 64 and pump 66 providing a source of pressurized fluid 62 for distribution to the RDM 20, 320. A scavenging apparatus 56 can be provided for scavenging pressurized fluid from other components supplied by the source of pressurized fluid 62 and the fluid sump 60 for redirecting the pressurized fluid to a plurality of lubrication distribution passages 152 in fluid communication predetermined locations within the RDM 20, 320 requiring on-demand lubrication. The lubrication delivery system 50 can minimize lubrication fluid in the RDM 20 and can be provided in lieu of splash lubrication to increase efficiency of the RDM 20. The lubrication delivery system 50 provides on-demand lubrication enabling use of a dry sump with lubricant supplied from a source of pressurized fluid 62 on-demand as determined by the control system 88 to operate the lubrication control valve 80 in accordance with a control program stored in memory. The predetermined locations in the RDM 20, 320 can include particular components requiring lubrication during engagement of the RDM 20, 320. As seen in FIGS. 1-3, the components can include the plurality of pinion gear bearings 148, the ring gear support bearings 128a, 128b, and at least one of the rear axle coupling clutch 28 and the differential control clutch 34. As illustrated in FIG. 4, the plurality of lube distribution passages can include at least one clutch distribution passage 150, at least one gear mesh distribution passage 158, at least one pinion gear bearing distribution passage 154, and at least one support bearing passage 156. As illustrated in FIG. 4, the lubrication delivery system 50 can further include passage shrouds 160 located along the differential axis for fluid passage through the ring gear 112 to predetermined locations in the RDM 20, 320. The lubrication delivery system 50 can further include a plurality of fluid passage apertures 152 for fluid passage to the predetermined locations. The plurality of fluid passage apertures 152 can include apertures drilled into the ring gear 212 allowing for the fluid to flow through the ring gear 212 towards the ring gear support bearings 228a, 228b. At least one of the passage shrouds 160 can additionally direct fluid through the ring gear support bearings 228b towards the ring gear support bearings 228a on the opposing side of the ring gear 212.

In order to facilitate the removal of parasitic losses in a rear driveline module (RDM) it is desirable to minimize the fluid level in the RDM below that of the rotating components. The present invention can provide lubrication to an RDM without using splash lubrication. The invention includes a lube distribution mechanism used in conjunction with an electrical lube pump to distribute oil to the components in the RDM that require lubrication during usage. These components can include hypoid gear set pinion bearings, ring gear support bearings, all-wheel drive clutches and hypoid gear mesh locations. In addition, there are provisions made to the RDM to direct oil into the required components. These provisions include oil directing shrouds on the ring gear axis and apertures drilled through the ring gear to provide a passage way for oil to flow to the support bearings. Additional shrouds are also used to direct oil through the ring gear support bearings opposite the ring gear.

A method for assembling the powertrain 10 can include assembling a hydraulically actuated rear axle coupling clutch 28 coaxial with a pair of half axleshafts 26a, 26b, connecting a single pump for supplying a source of pressurized fluid for actuation of the coupling clutch and for on-demand lubrication of a rear driveline module, and controlling fluid communication of the source of pressurized fluid with a hydraulic actuator system having control valves selectively operated by a control system in response to a control program stored in memory in response to sensed vehicle operating conditions. The method can include assembling a PTU 36 having an input shaft to receive rotary power from a front driveline input shaft gear 144, an intermediate gear 130 driving an input portion of a friction clutch pack 44c of a PTU coupling clutch, an output portion of the friction clutch pack 44c connected to a ring gear 140 for driving an output pinion gear 146 connected to output shaft 40. The output pinion shaft 40 can be interconnected with an input pinion shaft 22, 222 through a driveshaft 18.

The method can include connecting at least one of control valves 70a, 70b, 70c, 80 corresponding with a rear axle coupling clutch 28, and lubrication system. The control valves can also optionally control a PTU coupling clutch 42, and/or a differential control clutch 34. The plurality of control valves 70a, 70b, 70c, 80 can provide for fluid communication between the source of pressurized fluid 62 and at least one hydraulic actuator 90a, 90b, 90c and an on-demand lubrication system. The method can include connecting a lubrication control valve 80 in fluid communication with a source of pressurized fluid 62. The lubrication control valve 80 can provide for fluid communication between the source of pressurized fluid and various components in the RDM 20, 320 requiring on-demand lubrication. The method can include connecting at least one hydraulic actuator 90a, 90b, 90c in fluid communication with a corresponding at least one control valves 70a, 70b, 70c. The plurality of hydraulic actuators 90a, 90b, 90c can control actuation of the rear axle coupling clutch 28, the PTU coupling clutch 42, and the differential control clutch 34, respectively. The plurality of hydraulic actuators 90a, 90b, 90c can respond to fluid communication of pressurized fluid to frictionally load the corresponding clutch assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle powertrain (10) including a secondary drive split axle for driving a pair of wheels (14a, 14b), the improvement of the motor vehicle powertrain (10) comprising:
   a rear driveline module (RDM) (20, 320) including:
   a planetary gear assembly having a ring gear (112) defining a differential axis;
   a common planetary gear carrier supporting a first set and a second set of planetary gears (118a, 118b) for rotation about the differential axis, the first and second sets of planetary gears (118a, 118b) rotatable independently of one another;
   first and second sun gears (126a, 126b) connected to the pair of wheels (14a, 14b), respectively, the first sun gear (126a) meshing with the first set of planetary gears (118a) for driving one of the pair of wheels (14a) and the second sun gear (126b) meshing with the second set of planetary gears (118b) for driving another of the pair of wheels (14b);
   a hydraulically actuated coupling clutch (28) mounted on the differential axis interposed between the pair of wheels (14a, 14b);
   a single fluid pump (66) providing a source of pressurized fluid (62);
   a hydraulic control system (16) for selectively providing fluid communication from the single fluid pump (66) with the coupling clutch (28) for actuating the coupling clutch (28) and with a lubrication delivery system (50) for lubricating the ring gear (112), the first and second sets of planetary gears (118a, 118b), and the first and second sun gears (126a, 126b) on-demand from a fluid sump (60) separate from the RDM (20, 320), thereby eliminating shearing of fluid by the ring gear (112); and a lubrication control valve (80) for selectively providing fluid communication between the source of pressurized fluid (62) and the ring gear (112), the first and second sets of planetary gears (118a, 118b), and the first and second sun gears (126a, 126b) for lubrication when in a first position and for selectively providing fluid communication between the source of pressurized fluid (62) and at least one clutch control valve (70a, 70b, 70c) when in a second position.

2. The improvement of claim 1 further comprising:
a power take-off unit (PTU) (36) including a hydraulically actuated PTU coupling clutch (42) for selectively transmitting rotary power between a front driveline module and the rear driveline module (20, 320); and
wherein the hydraulic control system (16) selectively provides fluid communication with the PTU coupling clutch (42) for actuation with pressurized fluid from the single fluid pump (66).

3. The improvement of claim 2, wherein the at least one clutch control valve (70a, 70b, 70c) is a PTU clutch control valve (70c) for selectively providing fluid communication between the PTU coupling clutch (42) and the fluid sump (60) for actuation of the PTU coupling clutch (42) to a disengaged position when the PTU clutch control valve (70c) is in a first position and for selectively providing fluid communication between the source of pressurized fluid (62) and the PTU coupling clutch (42) for actuation of the PTU coupling clutch (42) to an engaged position when the PTU clutch control valve (70c) is in a second position.

4. The improvement of claim 1, wherein the at least one clutch control valve (70a, 70b, 70c) is a RDM clutch control valve (70a) for selectively providing fluid communication between the coupling clutch (28) and the fluid sump (60) for actuation of the coupling clutch (28) to a disengaged position when the RDM clutch control valve (70a) is in a first position and for selectively providing fluid communication between the source of pressurized fluid (62) and the coupling clutch (28) for actuation of the coupling clutch (28) to an engaged position when the RDM clutch control valve (70a) is in a second position.

5. The improvement of claim 1, wherein the lubrication delivery system further comprises:
a scavenging apparatus (56) scavenging fluid from the source of pressurized fluid (62) for redirecting the fluid to lube distribution passages in fluid communication with predetermined locations in the RDM (20, 320).

6. The improvement of claim 1, wherein the at least one clutch control valve (70a, 70b, 70c) selectively provides fluid communication between the at least one clutch (28, 34, 42) and the fluid sump (60) for actuation of the at least one clutch (28, 34, 42) to a disengaged position when the least one clutch control valve (70a, 70b, 70c) is in a first position and for selectively providing fluid communication between the source of pressurized fluid (62) and the at least one clutch (28, 34, 42) for actuation of the at least one clutch (28, 34, 42) to an engaged position when the at least one clutch control valve (70a, 70b, 70c) is in a second position; and
an accumulator (92) in fluid communication with the at least one clutch control valve (70a, 70b, 70c) for maintaining fluid pressure and volume to be supplied to the at least one clutch control valve (70a, 70b, 70c) of the hydraulic control system (16) when the lubrication control valve (80) is in the first position.

7. A motor vehicle powertrain (10) including a secondary drive split axle for driving a pair of wheels (14a, 14b), the improvement of the motor vehicle powertrain (10) comprising:
a rear driveline module (RDM) (20, 320) including:
a planetary gear assembly having a ring gear (112) defining a differential axis;
a common planetary gear carrier supporting a first set and a second set of planetary gears (118a, 118b) for rotation about the differential axis, the first set and second set of planetary gears (118a, 118b) rotatable independently of one another;
first and second sun gears (126a, 126b) connected to the pair of wheels (14a, 14b), respectively, the first sun gear (126a) meshing with the first set of planetary gears (118a) for driving one of the pair of wheels (14a) and the second sun gear (126b) meshing with the second set of planetary gears (118b) for driving another of the pair of wheels (14b);
a hydraulically actuated coupling clutch (28) mounted on the differential axis interposed between the pair of wheels (14a, 14b);
a single fluid pump (66) providing a source of pressurized fluid (62);
a hydraulic control system (16) for selectively providing fluid communication from the single fluid pump (66) with the coupling clutch (28) for actuating the coupling clutch (28) and with a lubrication delivery system (50) for lubricating the ring gear (112), the first and second sets of planetary gears (118a, 118b), and the first and second sun gears (126a, 126b); and
a hydraulically actuated differential control clutch (34) mounted on the differential axis coaxial with and adjacent to the coupling clutch (28) for speed differentiation between the pair of wheels (14a, 14b), wherein the hydraulic control system (16) selectively provides fluid communication with the differential control clutch (34) for actuation with pressurized fluid from the single fluid pump (66).

8. The improvement of claim 7, wherein the hydraulic control system (16) further comprises:
a differential clutch control valve (70b) for selectively providing fluid communication between the differential clutch (34) and a fluid sump (60) for actuation of the differential clutch (34) to a disengaged position when the differential clutch control valve (70b) is in a first position and for selectively providing fluid communication between the source of pressurized fluid (62) and the differential clutch (34) for actuation of the differential clutch (34) to an engaged position when the differential clutch control valve (70b) is in a second position; and
a lubrication control valve (80) for selectively providing fluid communication between the source of pressurized fluid (62) and the ring gear (112), the first and second sets of planetary gears (118a, 118b), and the first and second sun gears (126a, 126b) for lubrication when in a first position and for selectively providing fluid communication between the source of pressurized fluid (62) and the differential clutch control valve (70b) when in a second position.

9. The improvement of claim 7 further comprising:
a power take-off unit (PTU) (36) including a hydraulically actuated PTU coupling clutch (42) for selectively transmitting rotary power between a front driveline module and the rear driveline module (20, 320); and
wherein the hydraulic control system (16) selectively provides fluid communication with the PTU coupling clutch (42) for actuation with pressurized fluid from the single fluid pump (66).

10. The improvement of claim 9, wherein the hydraulic control system (16) further comprises:
a differential clutch control valve (70b) for selectively providing fluid communication between the differential clutch (34) and a fluid sump (60) for actuation of the differential clutch (34) to a disengaged position when the differential clutch control valve (70b) is in a first position and for selectively providing fluid communication between the source of pressurized fluid (62) and the differential clutch (34) for actuation of the differential clutch (34) to an engaged position when the differential clutch control valve (70b) is in a second position;
a PTU clutch control valve (70c) for selectively providing fluid communication between the PTU coupling clutch (42) and the fluid sump (60) for actuation of the PTU coupling clutch (42) to a disengaged position when the PTU clutch control valve (70c) is in a first position and for selectively providing fluid communication between the source of pressurized fluid (62) and the PTU coupling clutch (42) for actuation of the PTU coupling clutch (42) to an engaged position when the PTU clutch control valve (70c) is in a second position; and
a lubrication control valve (80) for selectively providing fluid communication between the source of pressurized fluid (62) and the ring gear (112), the first and second sets of planetary gears (118a, 118b), and the first and second sun gears (126a, 126b) for lubrication when in a first position and for selectively providing fluid communication between the source of pressurized fluid (62) and the differential clutch control valve (70b) and the PTU clutch control valve (70c) when in a second position.

11. A method of assembly for a motor vehicle powertrain (10) including a secondary drive split axle for driving a pair of wheels (14a, 14b), the improvement of the motor vehicle powertrain (10) comprising:
assembling a rear driveline module (RDM) (20, 320) including:
mounting a planetary gear assembly having a ring gear (112) defining a differential axis;
supporting a first set and a second set of planetary gears (118a, 118b) with a common planetary gear carrier for rotation about the differential axis, the first and second sets of planetary gears (118a, 118b) rotatable independently of one another;
connecting first and second sun gears (126a, 126b) to the pair of wheels (14a, 14b), respectively, the first sun gear (126a) meshing with the first set of planetary gears (118a) for driving one of the pair of wheels (14a) and the second sun gear (126b) meshing with the second set of planetary gears (118b) for driving another of the pair of wheels (14b);
mounting a hydraulically actuated coupling clutch (28) on the differential axis interposed between the pair of wheels (14a, 14b);

connecting a single fluid pump (66) with a source of pressurized fluid (62) for actuation of the coupling clutch (28) and on-demand lubrication of the RDM (20, 320);
controlling fluid communication of the source of pressurized fluid (62) with a hydraulic control system (16) having clutch control valves (70a, 70b, 70c) selectively operated by a control system (88) for selectively providing fluid communication from the single fluid pump (66) with the coupling clutch (28) for actuating the coupling clutch (28) and with a lubrication delivery system (50) for lubricating the ring gear (112), the first and second sets of planetary gears (118a, 118b), and the first and second sun gears (126a, 126b) from a fluid sump (60) separate from the RDM (20, 320), thereby eliminating shearing of fluid by the ring gear (112);
selectively controlling fluid communication between the source of pressurized fluid (62) and the ring gear (112), the first and second sets of planetary gears (118a, 118b), and the first and second sun gears (126a, 126b) with a lubrication control valve (80) for lubrication when in a first position; and
selectively controlling fluid communication between the source of pressurized fluid (62) and at least one of the clutch control valves (70a, 70b, 70c) with the lubrication control valve (80) when in a second position.

12. The method of claim 11 further comprising:
mounting a hydraulically actuated differential control clutch (34) on the differential axis coaxial with and adjacent to the coupling clutch (28) for speed differentiation between the pair of wheels (14a, 14b); and
selectively controlling fluid communication with the differential control clutch (34) for actuation with pressurized fluid from the single fluid pump with the hydraulic control system (16).

13. The method of claim 12 further comprising:
selectively transmitting rotary power between a front driveline module and the rear driveline module (20, 320) with a power take-off unit (PTU) (36) including a hydraulically actuated PTU coupling clutch (42); and
selectively controlling fluid communication with the PTU coupling clutch (42) for actuation with pressurized fluid from the single fluid pump (66) with the hydraulic control system (16).

14. The method of claim 11 further comprising:
selectively transmitting rotary power between a front driveline module and the rear driveline module (20, 320) with a power take-off unit (PTU) (36) including a hydraulically actuated PTU coupling clutch (42); and
selectively controlling fluid communication with the PTU coupling clutch (42) for actuation with pressurized fluid from the single fluid pump (66) with the hydraulic control system (16).

15. The method of claim 11 further comprising:
selectively controlling fluid communication between the at least one clutch (28, 34, 42) and the fluid sump (60) with the at least one of the clutch control valves (70a, 70b, 70c) for actuation of the at least one clutch (28, 34, 42) to a disengaged position when the at least one of the control valves (70a, 70b, 70c) is in a first position;
selectively controlling fluid communication between the source of pressurized fluid (62) and the at least one clutch (28, 34, 42) with the at least one of the clutch control valves (70a, 70b, 70c) for actuation of the at least one clutch (28, 34, 42) to an engaged position when the at least one of the clutch control valves (70a, 70b, 70c) is in a second position; and maintaining fluid pressure and volume to be supplied to the at least one of the clutch control valves (70*a*, 70*b*, 70*c*) of the hydraulic control system (16) with an accumulator (92) in fluid communication with the at least one of the clutch control valves (70*a*, 70*b*, 70*c*) when the lubrication control valve (80) is in the first position.

\* \* \* \* \*